Figure 1:
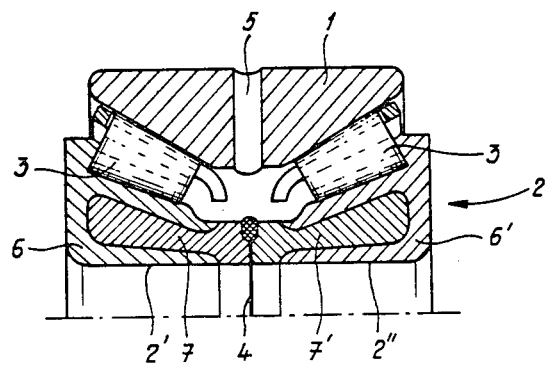

United States Patent [19]

Hollox

[11] Patent Number: 4,858,294

[45] Date of Patent: Aug. 22, 1989

[54] METHOD OF PRODUCING AN OBJECT, IN PARTICULAR A ROLLING BEARING, CONSISTING OF AT LEAST TWO MOVING PARTS LOCKED INTO EACH OTHER

[75] Inventor: Graham E. Hollox, Sheffield, England

[73] Assignee: SKF Industrial Trading and Development Co. B.V., Nieuwegein, Netherlands

[21] Appl. No.: 193,888

[22] Filed: May 13, 1988

[30] Foreign Application Priority Data

May 15, 1987 [NL] Netherlands ......................... 8701177

[51] Int. Cl.[4] ............................................. B21D 53/10
[52] U.S. Cl. ................................. 29/149.5 R; 29/724; 228/203; 228/263.15
[58] Field of Search .................. 29/149.5 R, 148.4 A, 29/724; 228/203, 263.15

[56] References Cited

U.S. PATENT DOCUMENTS

| 1,748,973 | 3/1930 | Buchwalter | 29/724 X |
| 3,586,396 | 6/1971 | Barr | |
| 3,704,498 | 12/1972 | Rundt | 79/148.4 A |
| 3,830,633 | 8/1974 | Harbottle | 29/724 X |
| 4,419,816 | 12/1983 | Kapaan et al. | 29/724 |

Primary Examiner—Timothy V. Eley
Attorney, Agent, or Firm—Rosen, Dainow & Jacobs

[57] ABSTRACT

A method of producing an object of at least two parts movable relative to each other, one of which parts is essentially locked inside the other, and wherein a rolling bearing is disposed, between the two parts in races, which includes at least one row of rolling elements enclosed thereby, one of the parts consisting of at least two separate pieces of steel subjected to a hardening operation, wherein these pieces are placed against each other in a proper position to form a parting seam, and wherein the rolling elements are inserted and the two parts are held together in that position, and wherein a high-energy radiation welding means is passed over the seam and activated, while a rotary motion of the energy beam and the two parts are brought about to weld the two pieces together, characterized in that the steel pieces are subjected to a surface hardening with the regions of the pieces bordering upon the seam shielded from the hardening process, so that they are not hardened.

5 Claims, 1 Drawing Sheet

METHOD OF PRODUCING AN OBJECT, IN PARTICULAR A ROLLING BEARING, CONSISTING OF AT LEAST TWO MOVING PARTS LOCKED INTO EACH OTHER

The invention relates to a method of producing an object consisting of at least two parts movable relative to each other, one of which parts or a portion thereof is locked essentially into the other part, in particular a rolling bearing in which at least one row of rolling elements is locked in between the two parts in the form of races, one of the parts being composed of at least two separate pieces of steel subjected to a hardening process, said pieces being placed against each other in proper position relative to the other part, where in particular the rolling elements are likewise inserted and the parts held in this position. Then a high-energy radiation welding means such as a laser or electron beam is placed over the parting line between the two parts and put into operation, while a rotary motion of the energy beam and the two parts held against each other is brought about relative to each other for welding the two parts together. Such a method is disclosed in U.S. Pat. No. 3,586,396.

It has been found that the seam obtained by this method becomes hard and brittle, which is a serious disadvantage of the method.

By the process according to the invention, the seam is prevented from becoming hard and brittle by subjecting the steel pieces to a surface hardening in which the regions of the pieces bordering upon the seam are shielded from the hardening operation, so that these regions are not hardened.

Preferably the surface hardening is effected by carbon cementation (carburizing) or by nitro cementation (carbo-nitriding).

In this way, the welding zone is not carbon cemented and consequently remains composed of soft steel with a comparatively low carbon content, so that the weld remains tough and strong.

Advantageously, the shielding of said regions is achieved by applying a coat of copper or by slurry immersion.

It is noted that a process as mentioned above for producing a rolling bearing with two rows of rolling elements is essentially kown from U.S. Pat. No. 4,419,816, where, in an integral outer race, an opening is made that, in assembled condition of the parts of the other race, is located opposed to the parting seam, and the high-energy radiation welding means is placed over the outside end of this opening so that the energy beam reaches the seam through said opening, the two parts of the inner race being jointly set in rotation.

Figure 2:
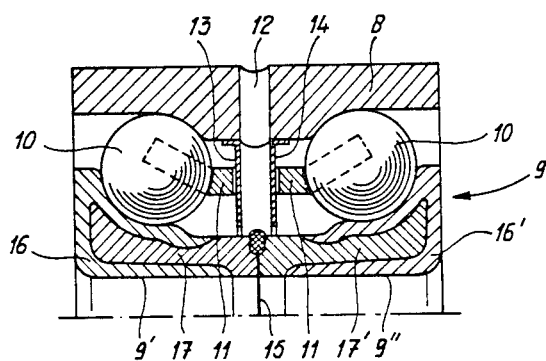

The invention will be illustrated in more detail with reference to the drawing, in which FIG. 1 shows a roller bearing with taper rollers, produced according to the invention, and FIG. 2 shows a ball bearing with two rows of balls, produced according to the invention.

As shown in FIG. 1, the roller bearing produced by the method of the invention comprises an outer race 1 and an inner race 2 made of two pieces 2', 2''. Between the outer race 1 and the inner race 2, two rows of taper rollers 3 are locked in. In the outer race 1, an opening 5 is made, through which the electron beam of the high-energy radiation welding means is aimed at the weld 4 upon assembly of the bearing, as described in the said U.S. Pat. No. 4,419,816.

As shown, the parts 2' and 2'' of the inner race 2, before they are welded together, are subjected to a surface hardening operation to produce a hardened surface region 6, 6'. Therefore an unhardened region 7, 7'', still consisting of soft steel, remain so that the weld 4 is located in a zone of the unhardened portion 7, 7'.

The ball bearing of FIG. 2 comprises an outer race 8 and an inner race 9 consisting of two pieces 9' and 9'', between which races two rows of balls 10 are locked in, held in cages 11. In the outer race 8, as before, an opening 12 is made, for the same purpose as the opening 5 in FIG. 1. Furthermore, on either side of said opening 12, two annular plates 13 and 14 are fixed to the inside of the outer race 8, serving to keep spatters from landing within the parts of the bearing when parts 9' and 9'' of the inner race are welded together at the seam 15, as described in the cited patent.

Here again, the parts 9' and 9'' of the inner race 9, before they are welded together, are so subjected to a surface hardening that a hardened surface region 16, 16' is produced. Therefore an unhardened region 17, 17', still consisting of soft steel, remain, so that the weld 15 is located in a zone of the unhardened portion 17, 17'.

I claim:

1. Method of producing an object of at least two parts movable relative to each other, one of which parts or a portion thereof is essentially locked inside the other part, and in particular a rolling bearing is disposed between the two parts, in the form of races, at least one row of rolling elements is enclosed therein, one of said parts consisting of at least two separate pieces of steel subjected to a hardening operation, wherein these pieces are placed against each other in a proper position relative to the other part to form a parting seam, and wherein the rolling elements are inserted and the two parts are held together in said proper position, and wherein a high-energy radiation welding means such as a laser or electron beam is passed over the parting seam between the two parts and activated, while a rotary motion of the energy beam and the two parts held together relative to each other is brought about to weld the two pieces together, characterized in that the steel pieces are subjected to a surface hardening with the regions of said pieces bordering upon the parting seam shielded from the hardening process, so that these regions are not hardened.

2. Method according to claim 1, characterized in that the surface hardening is effected by carbon cementation.

3. Method according to claim 1, characterized in that the surface hardening is effected by nitro cementation.

4. Method according to claims 1 to 3, characterized in that the shielding of the said regions is effected by applying a coating of copper.

5. Method according to claims 1 to 3, characterized in that the shielding of the said regions is effected by slurry immersion.

* * * * *